(12) United States Patent
Winkler

(10) Patent No.: US 7,116,726 B2
(45) Date of Patent: Oct. 3, 2006

(54) METHOD AND APPARATUS FOR TRANSFERRING MULTIPLE SYMBOL STREAMS AT LOW BIT-ERROR RATES IN A NARROWBAND CHANNEL

(75) Inventor: Clive Winkler, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 627 days.

(21) Appl. No.: 10/216,939

(22) Filed: Aug. 12, 2002

(65) Prior Publication Data

US 2004/0028146 A1    Feb. 12, 2004

(51) Int. Cl.
*H04K 1/02* (2006.01)
*H04B 1/38* (2006.01)

(52) U.S. Cl. ..................... 375/296; 375/219
(58) Field of Classification Search ................ 375/296, 375/297, 219, 222, 295, 316, 320, 279, 259–261, 375/268, 269, 283–285, 302, 308, 322, 329, 375/353; 708/100, 400, 403, 404; 332/127, 332/103, 144, 145; 329/304, 344, 345; 370/209
See application file for complete search history.

(56) References Cited

U.S. PATENT DOCUMENTS

| | | | | |
|---|---|---|---|---|
| 5,420,536 | A | 5/1995 | Faulkner et al. ............ 330/149 |
| 5,537,398 | A * | 7/1996 | Siwiak ........................ 370/204 |
| 5,551,070 | A | 8/1996 | Skarby et al. ............... 455/126 |
| 5,598,436 | A | 1/1997 | Brajal et al. ................ 375/297 |
| 5,633,896 | A * | 5/1997 | Carlin et al. ................ 375/340 |
| 5,732,113 | A * | 3/1998 | Schmidl et al. ............. 375/355 |
| 5,914,933 | A | 6/1999 | Cimini et al. ............... 370/208 |
| 6,094,458 | A * | 7/2000 | Hellberg ...................... 375/242 |
| 6,292,511 | B1 | 9/2001 | Goldston et al. ........... 375/235 |
| 6,298,035 | B1 * | 10/2001 | Heiskala ..................... 370/206 |
| 6,621,340 | B1 * | 9/2003 | Perthold et al. ............ 330/149 |

(Continued)

FOREIGN PATENT DOCUMENTS

WO    WO01/65794 A1    9/2001

OTHER PUBLICATIONS

Wesolowshi, Krzysztof & Pochmara, Janusz. "Efficient Algorithm for Adjustment of Adaptive Predistorter in OFDM Transmitter," Poznan University of Technology, e-mail: wesolows@ct.put.poznam.pl.

(Continued)

*Primary Examiner*—Tesfaldet Bocure
*Assistant Examiner*—Vineeta Panwalkar
(74) *Attorney, Agent, or Firm*—Townsend and Townsend and Crew

(57) ABSTRACT

A transceiver system employing vector feedback to linearize the transmitter over a narrowband channel to support concurrent low-rate subchannels, each providing a low bit error rate (BER). Symbols in each subchannel are transmitted at a rate sufficiently slow to avoid multipath errors, thereby spreading each signal component across the entire channel bandwidth to eliminate any remaining discrete non-linearity. The system provides for generating constellations of signal states that can be optimized for both phase and amplitude to represent symbols within existing narrowband mobile communications channels. Symbols are transmitted at a rate sufficiently slow in each subchannel to decorrelate multipath interference at the receiver, thereby better discriminating adjacent symbol states. This transceiver is particularly useful for mobile environments, although it applies equally well to stationary environments. Data sequences may be transferred at up to 110 kbits/sec within a standard 25 kHz RF channel for slow scan video applications.

19 Claims, 5 Drawing Sheets

U.S. PATENT DOCUMENTS 6,864,745 B1 * 3/2005 Ode et al. .................. 330/149
6,947,712 B1 * 9/2005 Sun et al. ................ 455/114.3
2002/0171485 A1 * 11/2002 Cova .......................... 330/149
2003/0109222 A1 * 6/2003 Sun et al. ..................... 455/24

OTHER PUBLICATIONS

Li, J., Muhonen, K.J., and Kavehrad, M. "Digital Predistortion Linearizer for Multicarrier Spread Spectrum." *IEEE* e-mail: jx1347@psu.edu.

Pinto, J.L. & Darwazeh, I. "Effects of Magnitude and Phase Distortion in 8-PSK systems on Error Vector Magnitude Measurements." Univ. of Manchester Institute of Science & Technology, e-mail: pinto@fs4.ee.unist.ac.uk.

Jayalath, A.D.S. & Tellambura, C. "Interleaved PC-OFDM to Reduce the Peak-to-Average Power Ratio." School of Computer Science & Software Engineering, Monash University, e-mail: jayalath@csse.monash.edu.au.

Knudsen, K., Fattouche, M., Zaghloul, H. & Heise, B. "Exploiting Pilot Subcarriers in OFDM Transceiver Systems to Augment Data Recovery." Wi-LAN, Inc., Alberta Canada.

Wang, Z. & Giannakis, G.B. "Linearly Precoded or Coded OFDM Against Wireless Channel Fades?" Dept. of Elec. & Comp. Eng., University of Minnesota, e-mail: {zhengdao, georgios}@ece.umn.edu.

Martone, M. "On the Necessity of High Performance RF Front-ends in Broadband Wireless Access Employing Multicarrier Modulations (OFDM)." WJ Communications, Palo Alto, CA 94304-1204, USA (IBN: 0-7803-6454) Jun. 2000 © 2000.

* cited by examiner

32APSK CONSTELLATION

METHOD AND APPARATUS FOR TRANSFERRING MULTIPLE SYMBOL STREAMS AT LOW BIT-ERROR RATES IN A NARROWBAND CHANNEL

BACKGROUND OF THE INVENTION

1. Field of the Invention

This invention relates generally to data communications systems and more particularly to a transceiver system for transferring multiple symbol states at low bit-error rates (BERs) in a narrowband channel.

2. Description of the Related Art

Many useful methods are known in the art for transmitting digital data through a channel. Radio-frequency (RF) channels are allocated by the Federal Communications Commission (FCC) and licensed for use by various entities, including the general public. Much of the Very-High/Ultra-High Frequency (VHF/UHF) band available to the general public is allocated in 25 kHz channels and new spectrum allocations are unavailable from the FCC because of demand from many other competing users. This allocation scheme prevents using these narrowband channels for many high-bandwidth communications applications. As used herein, "narrowband" denominates a bandwidth of less than 0.1%, which is understood to include the standard 25 kHz VHF (30–300 MHz) and UHF (300–3000 MHz) channel because it occupies a bandwidth less than 0.1% of the carrier frequency. Adapting such standard narrowband channels for video and other multimedia applications requires some new method for transferring data in a single 25 kHz channel at bit rates above the 19–20 kbits/sec limits known in the art for mobile applications.

The conventional RF channel capacity is limited by the distortion and noise arising from the hardware used to transmit and receive the RF signal and presents two basic challenges. Unless the channel transmitter hardware can be made to operate linearly over the range of signal power levels, no more than two signal states (symbols) can be used to reliably represent the data transferred in the channel. Unless the signal-to-noise ratio (SNR) at the receiver is high enough, then the uncertainty (blurring) of the symbol states at the receiver is too small to permit data recovery without error. Both of these challenges have been separately addressed by many practitioners in the art.

Discrimination among more than two symbol states at the transmitter and receiver is a useful method for increasing the amount of data transferred over a single channel. Unfortunately, the data rates in most systems known in the art, especially those well-known for mobile applications, are limited by the nonlinear operation of their transmitter components, such as amplifiers, modulators, mixers, and common integrated devices. But even introducing expensive precision components to improve transmitter operational linearity has limited effect on channel capacity when significant output power levels are required. The RF output device impedances change drastically over the extreme output power fluctuations encountered in high Peak-to-Average Power Ratio (PAPR) systems. This can, for example, produce uncontrollable phase shifts up to 30° between the two power extrema in a digital phase shift keying (PSK) modulated output waveform, thereby severely limiting discrimination among more than two symbol states at the transmitter. Linear Class A amplifiers avoid these large variations, but Class A amplifiers are grossly power-inefficient, which is a critical issue in most mobile applications.

Several other useful methods for linearizing the output characteristic of a RF transmitter are known in the art. For example, the basic feedback principle was introduced by Black in the 1920's. Black showed that distortion in the forward branch is reduced by 1/T, where T is the loop gain of the amplifier feedback combination. Distortion in the feedback branch appears directly in the output. The fundamental problem with basic feedback is that it uses an output that already exists to correct the input that caused the output distortion, which works well only with periodic signals and suffers from stability and bandwidth problems and from transient intermodulation distortion with signals that exceed the feedback loop bandwidth.

Other well-known linearizing methods also suffer from associated disadvantages that limit their application to the channel capacity problem. For example, predistortion methods require adding a predistortion to the amplifier input signal to compensate for amplifier nonlinearity. But the compensating nonlinearity widens the transmitted signal spectrum, requiring higher sampling rates, wider intermediate-frequency (IF) filters and so forth. Linear amplification with Nonlinear Components (LINC) methods are also well-known in the art but suffer generally from the disadvantageous requirements of high component precision and effective signal separation.

At radio frequencies, it may be difficult to achieve very high loop gain with simple feedback. One way to circumvent this is to form the error signal at the baseband frequency and use quadrature up- and down-conversion to provide orthogonal baseband components (I&Q) in the direct and feedback branches for linearizing the output. This is denominated "vector feedback," which is known in both Cartesian and polar feedback embodiments. But any mixer or amplifier device delays reduce the bandwidth achievable with this technique. Also, the achievable output linearity is directly reduced by any noise or non-linearity in the feedback mixers. Finally, over wideband channels, Cartesian feedback suffers from stability problems. However, these bandwidth and stability restrictions are largely offset by the simplicity and robustness of Cartesian feedback amplifiers, including embodiments using low-precision components.

Even with otherwise good SNR, discrimination among more than two symbol states at the receiver is limited by the phenomenon of multipath distortion, which may create interfering time-delayed copies of the original signal, distorting the received waveform and smearing the symbol content at the receiver. Many practitioners have proposed solutions to the wideband multipath distortion problem. Adaptive receivers for discriminating against selective in-band fading in wideband channels are known in the art but are not widely used because of high cost and complexity. Generally, a method of reducing the effective data rate is employed so that delayed versions of the original signal do not interfere at the receiver, at least on average, having decayed or decorrelated over a relatively long intersymbol time interval. One strategy for accomplishing this is to use multiple sub-carriers with a reduced data rate in each. For example, Ditzel et al. [Ditzel et al., "Minimal Energy Assignment for Frequency Selective Fading Channels," *International Symposium on Mobile Multimedia Systems & Applications* (*MMSA*2000), Delft, NL, December 2000] describe a method for minimizing the total energy necessary to communicate data with a desired average bit error rate at a fixed gross bit rate over a frequency-selective fading channel using multi-carrier data transmission. Ditzel et al. describe a numerical approach for splitting the data among multiple sub-carriers to reduce individual data rates with particular advantages for multi-carrier communications systems in channels with deep fades.

Orthogonal Frequency Division Multiplexing (OFDM) modulation is a well-known and effective technique for combating selective in-band fading through decorrelation of symbol echoes. With OFDM modulation, the fast Fourier transform (FFT) is used to break a broadband channel with intersymbol interference (ISI) into several narrower sub-channels, each exhibiting flat fading characteristics. Several multiuser OFDM schemes are known in the art, including time-division, frequency-division, and code-division multiplexing. Code-division multiplexing is an effective technique for capitalizing on the frequency diversity of an OFDM modulation system and frequency-division multiplexing with optimal subcarrier allocation is known to vastly outperform other multiuser techniques when the transmitter has knowledge of the channel.

The application of OFDM modulation to wideband channels suffers from several unresolved problems, which are described in excellent detail by Martone [Max Martone, "On the Necessity of High-Performance RF Front-ends in Broadband Wireless Access Employing Multicarrier Modulations (OFDM)," *GLOBECOM 2000—IEEE Global Telecommunications Conference*, no. 1, November 2000, pp. 1407–1411]. But Martone does not propose specific solutions to these problems other than noting that wideband OFDM modem throughputs are actually much lower than typically advertised for transceivers with low-performance analog RF circuits. In fact, Martone suggests that OFDM vulnerability to RF amplifier distortion is actually so severe that the "popularity of OFDM scheme should be revisited in light of practical RF implementation issues." Even so, Martone considers only RF channels typically much wider than 0.1% of the carrier frequency. Other problems with OFDM modulation in wideband channels include, for example, the severe symbol recovery problems presented when the channel has inband nulls or severe fades close to the FFT grid.

Various solutions are proposed for such problems. For example, Wang et al. [Wang et al., "Linearly Precoded or Coded OFDM against Wireless Channel Fades?" *Third IEEE Signal Processing Workshop on Signal Processing Advances in Wireless Communications*, Taoyuan, Taiwan, Mar. 20–23, 2001] propose adding a linear precoding to the symbols before multiplexing to overcome the loss of diversity otherwise experienced with critical fades. As another example, Wesolowski et al. [Wesolowski et al. "Efficient Algorithm for Adjustment of Adaptive Predistorter in OFDM Transmitter," *UTC'00, Fall*, Boston, 2000] describes a useful predistortion technique for "linearizing" or compensating the RF amplifier distortion in OFDM transceiver system. Wesolowski et al. suggest that other techniques such as clipping to reduce the high PAPR and adding error correction coding do little to improve the system bit-error rate (BER). In U.S. Pat. No. 5,598,436, Brajal et al. disclose and claim a OFDM modulated communications system employing a predistorter circuit between modulator and RF amplifier to compensate for RF amplifier nonlinearity, thereby solving the multicarrier distortion problem by pre-distorting the OFDM subcarriers instead of the initial symbols. Brajal et al. specifically distinguish their invention over the earlier monocarrier systems and neither consider nor suggest methods for improving channel capacity in a narrowband channel.

In U.S. Pat. No. 5,914,933, Cimini et al. describe a method for wireless transmission of data in a wideband channel where the frequency response characteristic of each transmission sub-channel is first measured and fed back to the transmitter before distributing the digital data symbols over several clusters and switching each cluster to the transmission sub-channel that is optimal according to the measured frequency response. The method described by Cimini et al. spreads the symbols over many carriers within a wideband channel and does not suggest the use of any particular modulation or encoding methods. Cimini et al. neither consider nor suggest methods for better exploiting an existing narrowband channel.

OFDM modulation as not generally been applied to narrowband (less than 0.1%) channel applications, perhaps because of less concern for selective in-band fading. The usual benefit of using OFDM in a frequency-selective environment is that the effects of delay variation over the channel are minimized by dividing the transmitted bandwidth into many narrower sub-channels that are transmitted in parallel, thereby eliminating the need for an expensive channel equalizer. This also reduces the PAPR at the transmitter because fewer tones are transmitted per subchannel, producing less spectral spreading by any transmitter nonlinearities.

Practical OFDM modulation systems may employ, in each of the several subcarriers, quadrature phase shift keying (QPSK), eight-phase shift keying (8PSK), or some form of amplitude/phase shift keying (APSK) or quadrature amplitude modulation (QAM). Because APSK is merely a combination of amplitude shift keying (ASK) and PSK modulation, the term APSK modulation is intended to include PSK modulation and QAM, as used herein. It is known in the art that the error performance of APSK systems generally, for example, 8PSK and 32QAM systems, depends strongly on phase distortion from noise and system nonlinearities (see, for example, J. Pinto and I. Darwazeh, "Magnitude and Phase Distortion Effects on Error Vector Magnitude in 8-PSK Systems," *Proceedings of 3rd Conference on Telecommunications (Conftele-2001), Figuera da Foz-Portugal*, pp. 351–355, April 2001). Disadvantageously, in many narrowband mobile system applications, high level APSK constellations are impractical because the amplitude of the signal (representing the symbol state) can fade to become indistinguishable from an adjacent symbol state. Wireless transmission systems using OFDM modulation are attractive because of their high spectral efficiency and resistence to noise and multipath distortion. But OFDM modulated transceiver systems disadvantageously require additional signal processing steps or pilot subcarrier symbols to achieve the BER of associated spread-spectrum techniques, thereby imposing a corresponding burden on useable channel capacity and limiting usefulness in narrowband channels. Moreover, the use of computationally-efficient FFT multiplexing methods generally requires an inter-symbol guard interval greater than the channel delay to avoid inter-symbol interference (ISI) and inter-channel interference (ICI), presenting yet another disadvantage for narrowband OFDM applications.

Generally, until now, there has been no method known in the art that can effectively transfer a data sequence through a single standard 25 kHz VHF/UHF channel at bit rates above about 19.2 kbits/sec in mobile applications. Commercial applications requiring more capacity use wideband channels at higher base frequencies in the cellular spectrum. There is accordingly a clearly-felt need in the art for a transceiver system that exploits more of the typical 0.1% narrowband (e.g., 25 kHz VHF/UHF) channel. These unresolved problems and deficiencies are clearly felt in the art and are solved by this invention in the manner described below.

SUMMARY OF THE INVENTION

The transceiver system of this invention solves the above problem for the first time by applying vector feedback to linearize the transmitter over a narrowband radio frequency (RF) channel so that it can support multiple low-rate subchannels, each providing a low bit error rate (BER). The transceiver system of this invention provides for generating constellations of signal states that can be optimized for both phase and amplitude to represent symbols within existing narrowband mobile communications channels. The linearized transmitter apparatus transmits the precise input waveform with negligible distortion so that the receiver apparatus can accurately discriminate adjacent symbol states in a mobile (multipath) environment. Each signal component is spread across the entire channel bandwidth to eliminate any remaining discrete non-linearity. Symbols are transmitted at a rate sufficiently slow in each subchannel to decorrelate multipath interference at the receiver, thereby better discriminating adjacent symbol states.

It is a purpose of this invention to provide a new class of transceiver systems particularly useful for slow scan video and other applications in mobile environments, although the method and system of this invention applies equally well to stationary environments. This transceiver system permits using higher data traffic density to transfer a data sequence at up to 110 kbits/sec within standard 25 kHz RF channels, which represents an improvement of 500–600% over the existing art. It is an advantage of this invention that the receiver may be adapted to include an adaptive equalizer to improve the discrimination of the phases of adjacent symbol states in the receiving system. It is another advantage of this invention that ever-present pilot tones may be added to provide for correction of amplitude errors in the received signal to eliminate amplitude/phase shift keying (APSK) symbol state errors in narrowband channels such as the standard 25 kHz public VHF/UHF channel. Because APSK is merely a combination of amplitude shift keying (ASK) and phase shift keying (PSK) modulation, the term APSK modulation is intended to include PSK modulation and QAM, as used herein.

In one embodiment, a Cartesian vector feedback method is advantageously employed to linearize the transmitter in a standard 25 kHz VHF/UHF channel because it provides stable loop bandwidths well in excess of the 25 kHz channel bandwidth of interest. Such stability is available over a wide range of operating frequencies in a system implemented with digital signal processor (DSP) control. Eliminating phase and amplitude errors by linearizing the transmitter permits discrimination of more symbol states, thereby increasing the effective data transmission rate through the channel. The method of this invention can also be used to provide a digital RF link using high-level APSK waveforms with enhanced linearity at power levels up to 300 Watts.

In one aspect, the invention is a method for transferring a data sequence through a narrowband RF channel, including the steps modulating a plurality of concurrent subchannel carriers with APSK modulation to represent the data sequence, producing a complex orthogonal frequency-division multiplexed (OFDM) signal representing the inverse Fourier transform (IFT) of a combination of the modulated subchannel carriers, modulating a channel carrier signal with the complex OFDM signal, amplifying the modulated channel carrier signal to produce an output signal, producing two vector baseband feedback signals corresponding to the output signal, adjusting the modulated channel carrier signal to maintain output signal linearity responsive to the two vector baseband feedback signals in a feedback loop, and receiving and demodulating a narrowband RF signal representing the output signal to recover the data sequence.

In another aspect, the invention is a method for transferring a data sequence through a narrowband RF channel including the steps of (a) transmitting a narrowband RF signal by distributing the data sequence over a plurality of concurrent sub-sequences, modulating each of a plurality of subchannel carriers with a corresponding sub-sequence, producing a complex OFDM signal representing the IFT of a combination of the modulated subchannel carriers, modulating a channel carrier signal with the complex OFDM signal, amplifying the modulated channel carrier signal to produce an output signal representing the narrowband RF signal, producing two vector baseband feedback signals corresponding to the modulated channel carrier signal, and adjusting the modulated channel carrier signal to maintain output signal linearity responsive to the two vector baseband feedback signals in a feedback loop; and (b) receiving the narrowband RF signal by detecting the narrowband RF signal, producing an input signal representing the Fourier transform (FT) of the narrowband RF signal, and demodulating the input signal to recover a corresponding plurality of concurrent sub-sequences and the corresponding data sequence.

In an exemplary embodiment, the invention is a transceiver system for transferring a data sequence through a narrowband RF channel, including a APSK modulator for modulating a plurality of concurrent subchannel carriers with APSK modulation to represent the data sequence, a DSP for producing a complex OFDM signal representing the IFT of a combination of the modulated subchannel carriers, a complex modulator coupled to the DSP for modulating a channel carrier signal with the complex OFDM signal, a power amplifier for amplifying the modulated channel carrier signal to produce an output signal, a vector linearizer for producing two baseband vector feedback signals corresponding to the output signal, a feedback loop for adjusting the modulated channel carrier signal to maintain output signal linearity responsive to the two baseband vector feedback signals, and a receiver for receiving and demodulating a narrowband RF signal representing the output signal to recover the data sequence.

In an alternative embodiment, the invention is a transmitter for transmitting a narrowband RF signal to transfer a data sequence through a narrowband RF channel, including a digital multiplexer for distributing the data sequence over a plurality of concurrent sub-sequences, a subchannel modulator coupled to the digital multiplexer for modulating each of a plurality of subchannel carriers with a corresponding sub-sequence, a DSP coupled to the subchannel modulator for producing a modulated channel carrier signal representing the IFT of a combination of the modulated subchannel carriers, a complex modulator coupled to the DSP for modulating a channel carrier signal with the complex OFDM signal, a power amplifier coupled to the modulator for amplifying the modulated channel carrier signal to produce an output signal, a vector linearizer circuit coupled to the power amplifier for producing two vector baseband feedback signals corresponding to the output signal, and a feedback loop coupling the vector linearizer circuit to the modulator for adjusting the modulated channel carrier signal to maintain output signal linearity responsive to the two vector baseband feedback signals.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE EMBODIMENTS

Figure 1:
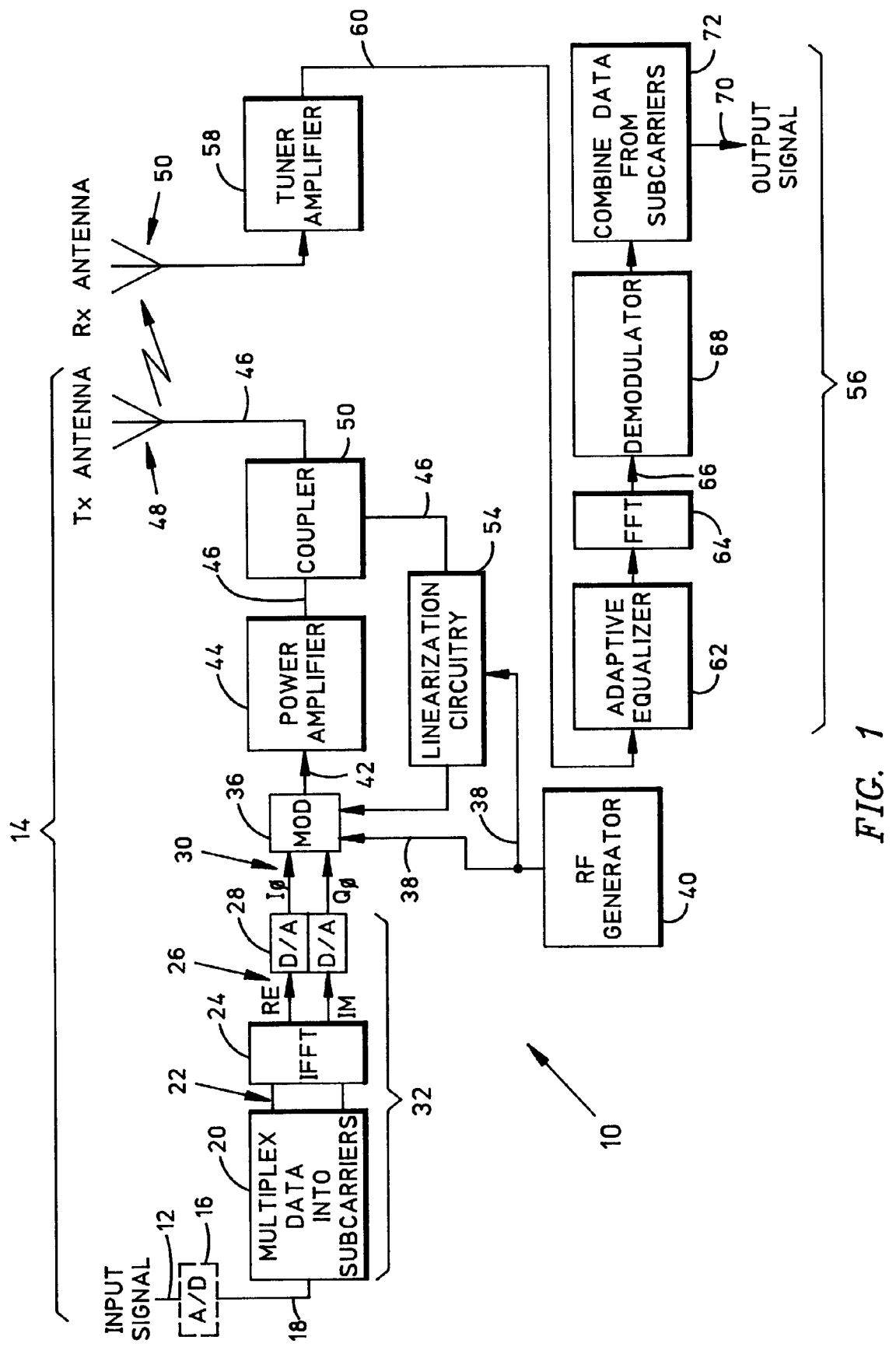
FIG. 1 is a block diagram illustrating an exemplary embodiment of the transceiver system of this invention.

FIG. 1 is a block diagram illustrating an exemplary embodiment 10 of the transceiver system of this invention. Although transceiver system 10 is illustrated as part of a narrowband wireless radio frequency (RF) communications system, the method and system of this invention are not so limited and may be advantageously applied to a variety of wireless and wired narrowband communication systems and in other frequency bands, such as, for example, satellite, cellular telephone, cordless telephone, cable telephony, radar, microwave, infrared and optical communication systems, without limitation. While this description is principally concerned with an exemplary narrowband digital transmission application, the system of this invention is equally applicable to communication through a high-resolution narrowband analog channel using one or more of the methods of this invention.

In FIG. 1, an incoming signal 12, which may be a digital data stream or an analog audio signal, is provided to the input terminal 12 of a wireless transmitter 14. If signal 12 is an analog signal, then it is applied to the terminals of an analog to digital (A/D) converter 16 to digitize the signal and produce the data stream at the input bus 18. The fixed-rate data sequence at bus 18 is then redistributed into a plurality of slower-rate concurrent sub-sequences (not shown) by the digital multiplexer and subchannel modulator 20, wherein the sum of all sub-sequence data rates (less any redundancy coding overhead) is equivalent to the fixed data sequence rate. Each data sub-sequence is then used within digital multiplexer and subchannel modulator 20 to modulate a corresponding one of a plurality of optimally-spaced subchannel carriers with the slower-rate data. Each subchannel carrier is modulated in parallel and a plurality of modulated subchannel carriers are combined to create a complex waveform at the bus 22. The digital inverse Fourier transform (IFT) processor 24 then accepts complex waveform 22 and computes the IFT thereof to produce a complex digital orthogonal frequency-division multiplexed (OFDM) signal 26 that represents the data sequence within the narrowband channel. The dual digital-to-analog (D/A) converter 28 converts the complex digital OFDM signal 26 to a complex analog OFDM signal 30 consisting of the two analog in-phase and quadrature ($I_O$, $Q_O$) components, which are orthogonal waveforms of identical frequency that are shifted by precisely 90° with respect to the other. The functionalities of digital multiplexer and subchannel modulator 20, digital inverse Fourier transform (IFT) processor 24, and dual digital-to-analog (D/A) converter 28 are preferably embodied within a monolithic digital signal processor (DSP) 32 to reduce hardware cost and complexity.

Analog ($I_O$, $Q_O$) components of complex analog OFDM signal 30 are independently amplified in the dual differential operational amplifier 34 (FIG. 2) and applied to the respective in-phase and quadrature (I, Q) ports of a complex modulator 36, which modulates a local oscillator (LO) carrier signal 38 produced by the RF generator 40 to produce a single modulated channel carrier signal 42. Modulated channel carrier signal 42 is coupled to a power amplifier 44 to produce an output signal 46. Output signal 46 may be filtered (not shown) before it is coupled to an antenna 48 for wireless transmission through the narrowband RF channel to a receiving antenna 50. A sample of output signal 46 is taken at a directional coupler 52 and coupled to the vector linearizer circuit 54, wherein the sample of output signal 46 is mixed with a phase delayed version of the original RF carrier signal 38 and coupled to the inverting inputs of dual differential operational amplifier 34, as may be appreciated with reference to FIG. 2 described below.

Continuing with FIG. 1, the narrowband RF waveform is received by antenna 50 in the receiving system 56 and detected by the tuner amplifier 58, which produces an analog signal 60 that is coupled through an adaptive equalizer 62 to a DSP section 64 that is disposed to produce an input signal 66 representing the fast Fourier transform (FFT) of the equalized analog signal 60. Although receiver 56 is linear, it includes various filters, mixers, circuit interconnects, and other elements that induce small phase errors during internal signal transfers (often called linear distortion). Adaptive equalizer 62 operates to compensate for these internal phase errors by measuring such errors during reception of a strong signal and storing the correction coefficients, which are frozen and applied to the received signal during poor reception to remove all the small, accumulated channel errors. This adaptive error cancellation allows receiver 56 to synchronize to the symbol boundaries, to perform the FFT to recover input signal 66 representing the modulated subchannel carriers and to discriminate unambiguously among all symbol states in the demodulator 68 as necessary to decode and assemble the original data sequence 70 in the DSP section 72 in a mobile environment.

Figure 2:
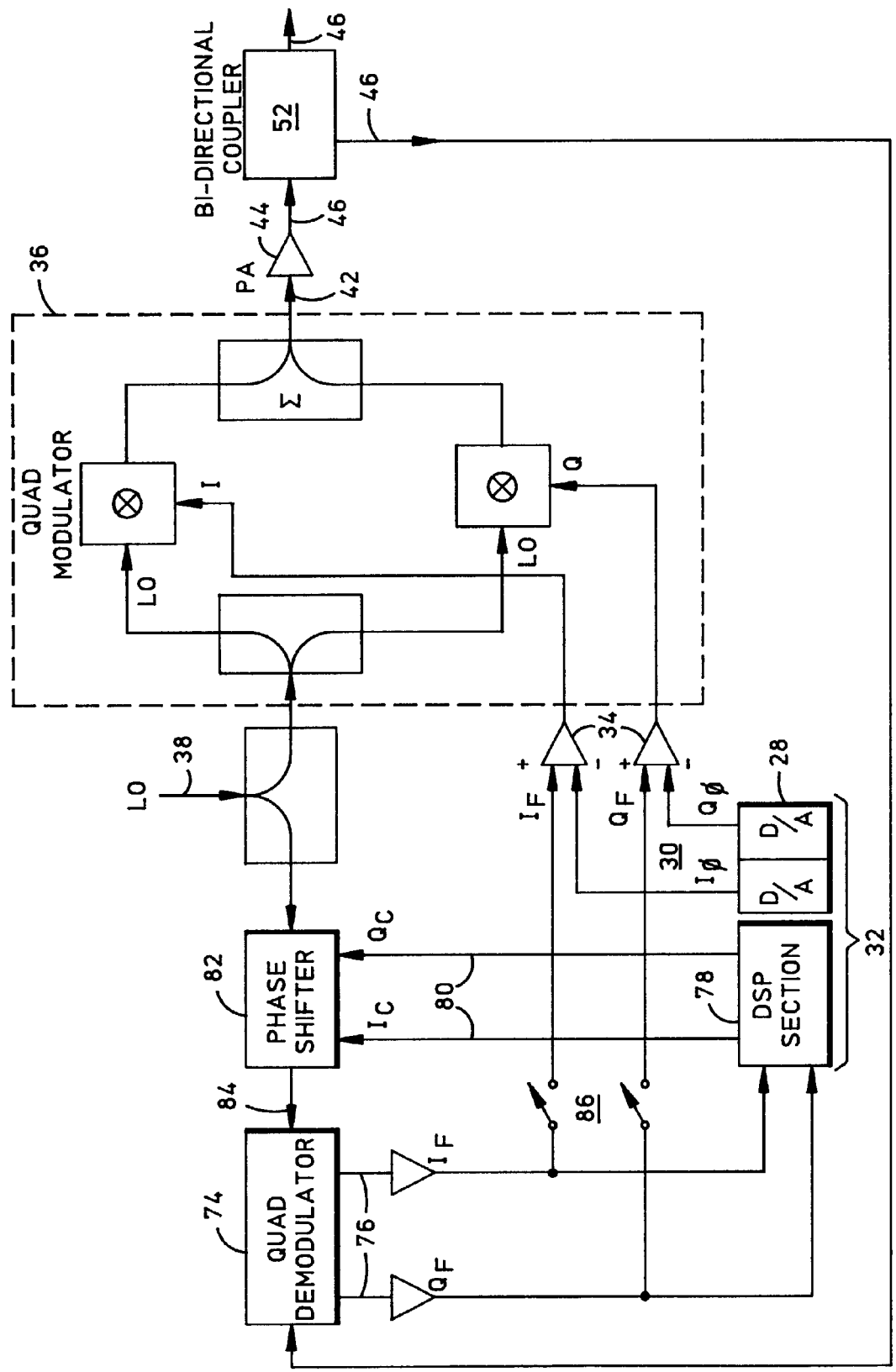
FIG. 2 is a block diagram illustrating a Cartesian vector linearizer circuit embodiment from the system of FIG. 1.

FIG. 2 is a block diagram illustrating a Cartesian embodiment of vector linearizer circuit 54 from FIG. 1. In FIG. 2, the sample of output signal 46 is coupled to a complex demodulator 74, which produces the vector baseband feedback signal ($I_F$, $Q_F$) components 76, which represent the Cartesian expression of the complex baseband modulation present in output signal 46. Any complex baseband modulation may also be expressed as two polar components (mag, theta) representing vector magnitude and angle (not shown), which are related to the correspond Cartesian components in the well-known manner. Vector baseband feedback signal ($I_F$, $Q_F$) components 76 are coupled to the inverting inputs of dual differential operational amplifier 34, thereby adjusting the modulated channel carrier signal 42 as necessary to maintain the linearity of output signal 46. Vector baseband feedback signal ($I_F$, $Q_F$) components 76 are also coupled the DSP section 78, the functionality of which may be included in monolithic digital signal processor (DSP) 32. DSP section 78 applies the complex control signal ($I_C$, $Q_C$) components 80 to a phase shifting device 82 to delay the phase of LO carrier signal 38 and produce the delayed LO carrier signal 84. Because complex demodulator 74 refers to delayed LO carrier signal 84 to produce vector baseband feedback signal ($I_F$, $Q_F$) components 76, this adjustment operates under the control of DSP section 78 to keep the vector linearizer circuit 54 feedback loop unconditionally stable over the entire tuning range of transmitter 14. The switches 86 provides for the removal of vector baseband feedback signal ($I_F$, $Q_F$) components 76 from the inverting inputs of dual differential operational amplifier 34 to open the vector linearizer circuit 54 feedback loop if desired. The operation of complex modulator 36 provides for the modulation of the LO carrier signal 38 with the complex analog OFDM signal 30 in the manner well-known in the art, thereby producing modulated channel carrier signal 42.

In operation, transceiver system 10 of this invention may employ any of several useful subcarrier modulation constellations. For example, without limitation, digital multiplexer and subchannel modulator 20 may include means for encoding a multiple APSK modulation constellation such as 8PSK or 16QAM. Because APSK is merely a combination of amplitude shift keying (ASK) and PSK modulation, the term APSK modulation is intended to include PSK modulation and QAM, as used herein. Unlike a conventional serial data system wherein the data symbols are transferred sequentially with the frequency spectrum of each symbol occupying the entire available channel bandwidth, the parallel system of this invention transfers several data symbols concurrently by encoding a plurality of concurrent modulated subcarriers in a OFDM signal that divides the data among a plurality of closely-spaced carrier frequencies occupying the entire available channel bandwidth. This method has the advantage that the subchannel data rate is much slower than the overall channel data rate. This ensures that multipath distortion in each subchannel may be decorrelated at the receiver. Subchannel fading and channel equalization issues are not particularly relevant to the system of this invention because the channel bandwidth is limited to 0.1% of carrier frequency, meaning that any fading is likely to simultaneously affect all subchannels. But any useful data encoding techniques is suitable for the system of this invention, such as, without limitation, cyclic codes or Reed-Solomon codes, thereby facilitating any of many useful methods for robust error correction at the receiver.

Figure 3:
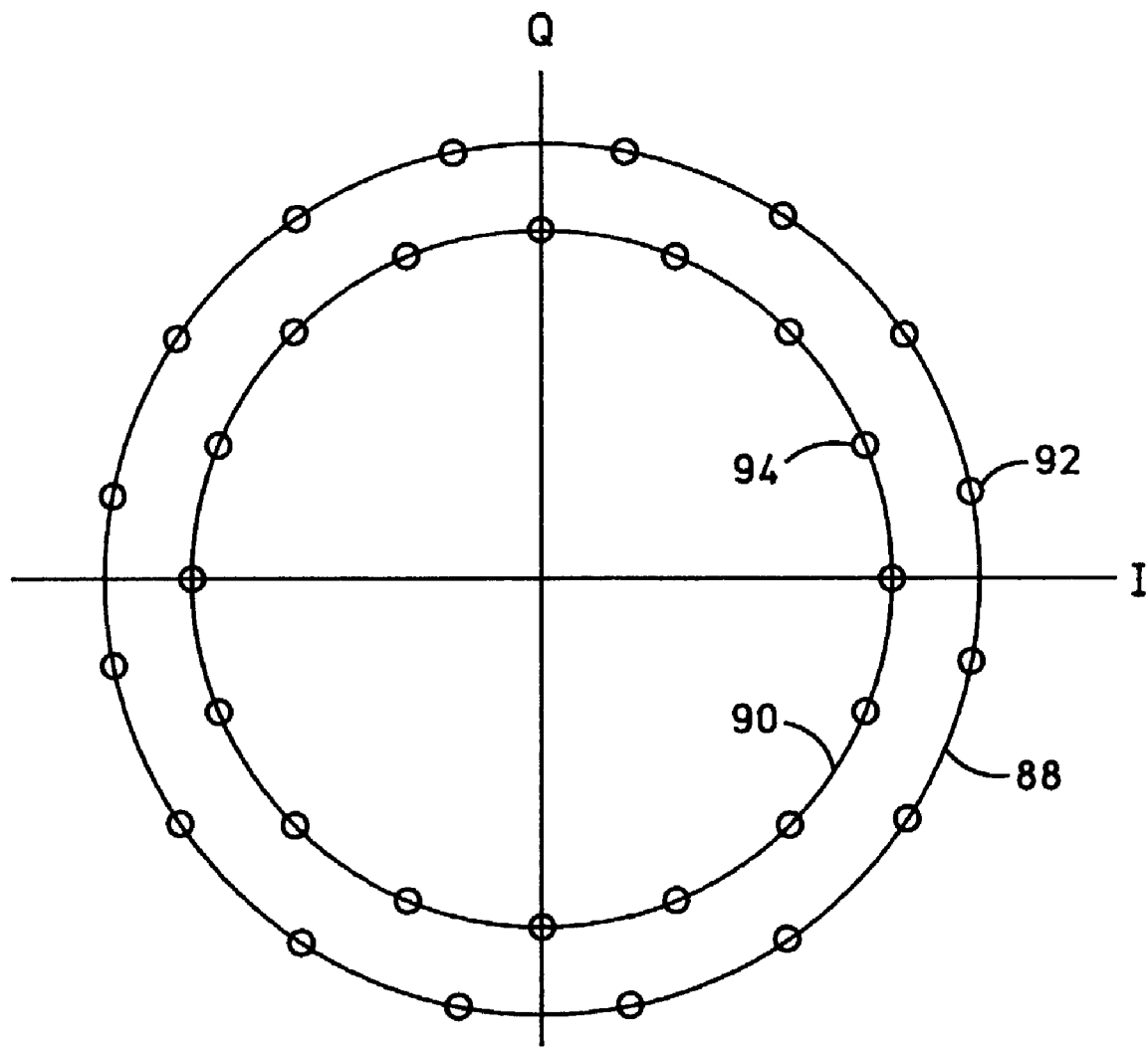
FIG. 3 is a state diagram of a preferred APSK constellation of signal states illustrating the operation of the subchannel modulator of the exemplary system of FIG. 1.

FIG. 3 is a state diagram of a preferred APSK constellation of signal states illustrating the operation of digital multiplexer and subchannel modulator 20 (FIG. 1). The constellation is illustrated in the complex signal plane and includes two sets of sixteen equally-spaced phase states each disposed at one of two amplitude states 88 and 90 for a total of thirty-two signal states. The thirty-two signal states are exemplified by the phase state 92 at amplitude state 88 and the phase state 94 at amplitude state 90. The distance between signal states in FIG. 3 is commonly expressed as a vector magnitude (VM) representing the linear separation of the two states in the complex signal plane. For example, each of the sixteen phase states on amplitude state 88 are separated by about 40% (Tan 22.5°) of the state vector magnitude. The phase states at amplitude state 90 are disposed midway between the phase states at amplitude state 88 to provide an initial VM of about 20% before reducing amplitude state 90 to expand the VM spacing between the two amplitude states, which may be established to roughly equalize the adjacent state separation VMs (to an approximation of the distance between adjacent single-amplitude phase states) over the entire constellation. During operation, a subcarrier is modulated with a binary signal switching between a selected pair of the signal states in the constellation. The separation between adjacent signal states permits concurrent transfer of several subcarriers each modulated with a different state. Each of the signal states is received with some amount of state error, such as may be represented by the small circle at state 92, which is commonly denominated the error vector magnitude (EVM) and represents the distance of the received state from the theoretical state on the complex signal plane. The inventor has measured EVM values of less than 3% (of the state vector magnitude) for an early embodiment of transceiver system 10.

Figure 4:
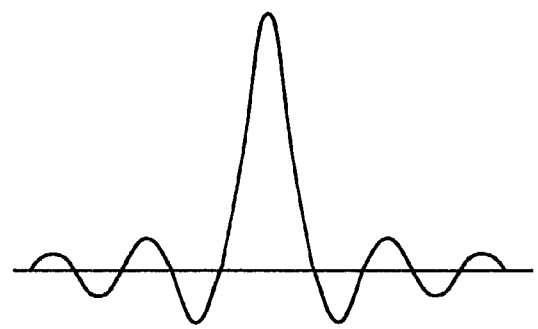
FIG. 4 is an illustration of the baseband spectrum of an illustrative subchannel.
Figure 5:
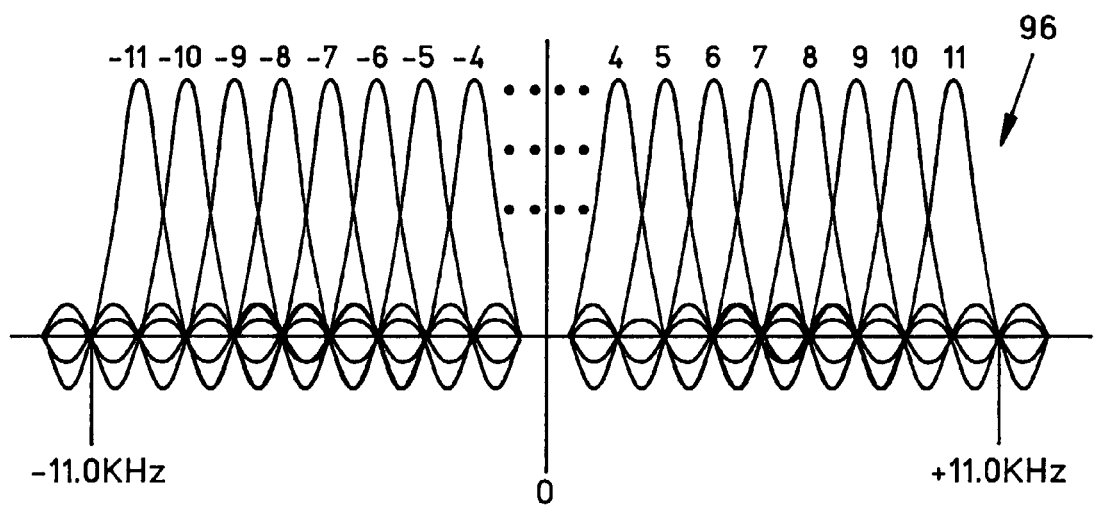
FIG. 5 is an illustration of the baseband spectrum of a preferred orthogonal frequency-division multiplexed (OFDM) signal representing twenty-two subchannels in a 25 kHz channel.

FIG. 4 is an illustration of the baseband spectrum of an illustrative subchannel such as may represent, for example, the IFFT of state 92 in the constellation of FIG. 3. Some or all of the signal states in the constellation of FIG. 3 may be used to encode a concurrent plurality of modulated subchannel carriers; for example, twenty-two of the thirty-two available signal states may be selected to represent twenty-two modulated subchannel carriers, which may then be combined and processed by digital inverse Fourier transform (IFT) processor 24 to produce the complex analog OFDM signal baseband spectrum 96 shown in FIG. 5. Complex analog OFDM signal 96 is an exemplary preferred embodiment representing twenty-two subchannels spaced at 1.0 kHz in a standard narrowband 25 kHz channel, leaving a 1.5 kHz guard-band at each edge of the standard channel. The inventor has measured data sequence transfer rates of up to 110 kbits/sec within a standard 25 kHz RF channel in the transceiver system of this invention using the signal configuration of complex analog OFDM signal, which represents an improvement of 500–600% over the existing art.

Figure 6:
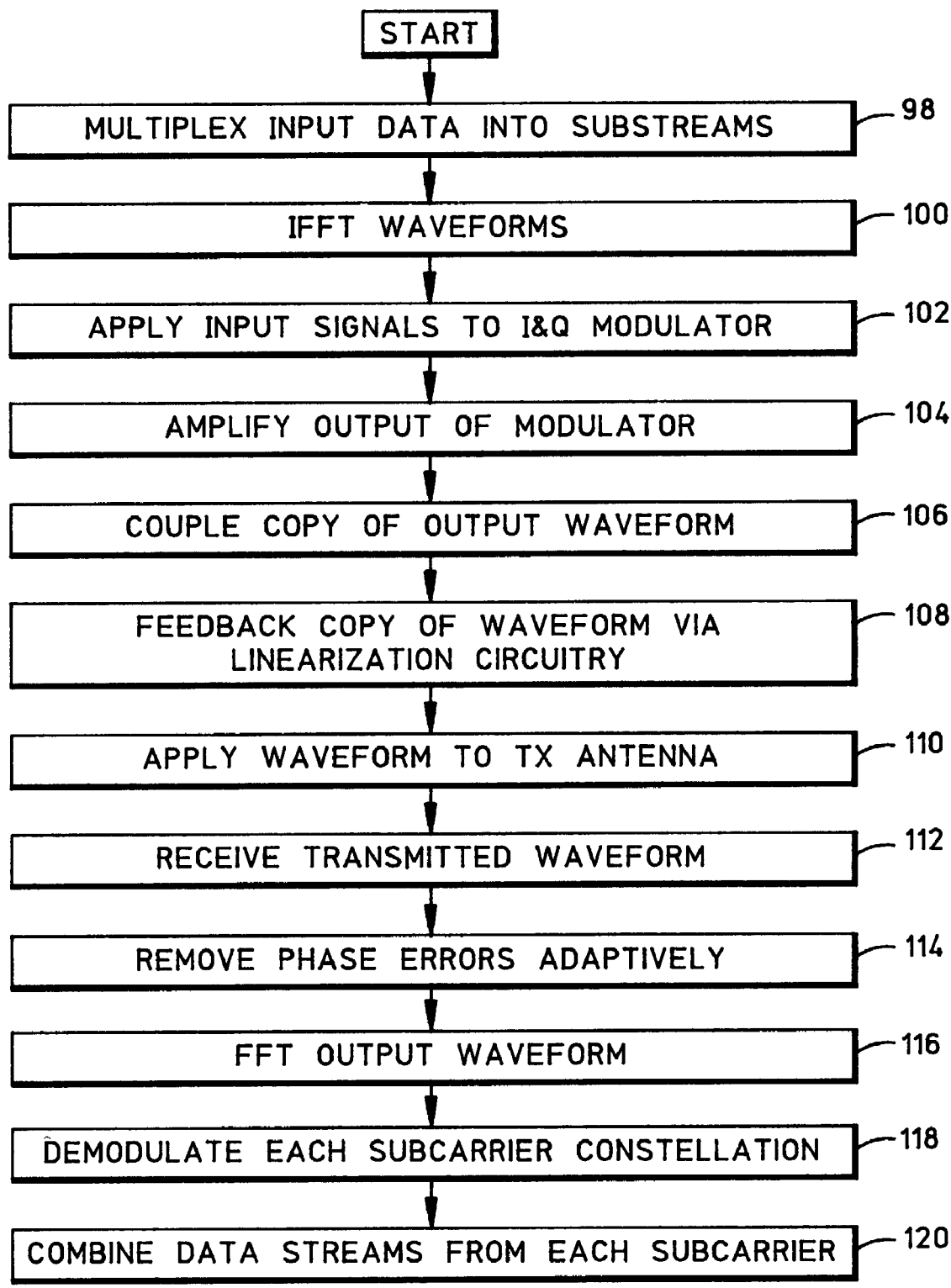
FIG. 6 is a flowchart diagram illustrating the communication method of this invention.

FIG. 6 is a flowchart diagram illustrating the data communication method of this invention. In the first step 98, the incoming data sequence is distributed over a plurality of concurrent sub-sequences and each subsequence is used to modulate a corresponding subchannel carrier signal in any useful manner, which may include coding schemes for error correction, interleaving schemes, and the like. In the next step 100, the inverse fast Fourier transform (IFFT) is obtained for a combination of the modulated subchannel carriers, which represents a complex OFDM baseband signal. In the step 102, a channel carrier signal is modulated with the complex OFDM signal in a complex modulator. In the next step 104, the modulated channel carrier signal is amplified to produce an output signal, which is then sampled in step 106 to produce two vector baseband feedback signals corresponding to the modulated channel carrier signal, and fed back in step 108 through a feedback loop to adjust the modulated channel carrier signal to maintain output signal linearity. The output signal is also coupled to a transmit antenna in the step 110, from which it radiates as a narrowband RF signal.

Continuing with FIG. 6, the narrowband RF signal is received and detected in the step 112 and coupled to an adaptive equalizer, which measures and stores phase errors induced by the receiver circuitry in the detected narrowband RF signal during intervals of good signal-to-noise ratio (SNR). In the next step 114, the stored error measurements are used to adjust the detected narrowband RF signal phase to remove phase errors induced in the receiver circuitry. In step 116, an input signal is produced representing the fast Fourier transform (FFT) of the "equalized" narrowband RF signal, and the input signal is demodulated in the step 118 to recover the corresponding plurality of sub-sequence waveforms, which are combined appropriately in the final step 120 to recover the corresponding data sequence.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A method for transferring a data sequence through a narrowband channel comprising the steps of:
   (a) transmitting a narrowband signal, including the steps of
      (a.1) distributing the data sequence over a plurality of concurrent sub-sequences,
      (a.2) modulating each of a plurality of subchannel carriers with a corresponding sub-sequence,
      (a.3) producing a complex orthogonal frequency-division multiplexed (OFDM) signal representing the inverse Fourier transform (IFT) of a combination of the modulated subchannel carriers,
      (a.4) modulating a channel carrier signal with the complex OFDM signal,
      (a.5) amplifying the modulated channel carrier signal to produce an output signal representing the narrowband signal,
      (a.6) producing two vector baseband feedback signals corresponding to the output signal, in part, by demodulating the output signal using a delayed channel carrier signal, and
      (a.7) adjusting the modulated channel carrier signal to maintain output signal linearity responsive to the two vector baseband feedback signals in a feedback loop, and
   (b) receiving the narrowband signal, including the steps of
      (b.1) detecting the narrowband signal,
      (b.2) producing an input signal representing the Fourier transform (FT) of the narrowband signal, and
      (b.3) demodulating the input signal to recover a corresponding plurality of sub-sequence waveforms, and the corresponding data sequence.

2. The method of claim 1 further comprising the step of:
   (a.3.1) modulating each of the plurality of subchannel carriers with amplitude phase shift keying (APSK) modulation.

3. The method of claim 2 further comprising the steps of:
   (a.6.1) producing two Cartesian vector baseband feedback signals corresponding to the output signal; and
   (a.7.1) adjusting the Cartesian vector baseband feedback signal phases to stabilize the feedback loop.

4. The method of claim 3 further comprising the steps of:
   (b.1.1) measuring and storing phase errors in the detected narrowband signal during selected time intervals; and
   (b.1.2) adjusting the detected narrowband signal phase responsive to the stored phase error measurements.

5. The method of claim 1 further comprising the steps of:
   (b.1.1) measuring and storing phase errors in the detected narrowband signal during selected time intervals; and
   (b.1.2) adjusting the detected narrowband signal phase responsive to the stored phase error measurements.

6. A method for transferring a data sequence through a narrowband channel occupying a bandwidth of less than approximately 0.1% of a carrier frequency, comprising the steps of:
   (a) modulating a plurality of concurrent subchannel carriers with amplitude phase shift keying (APSK) modulation to represent the data sequence;
   (b) producing a complex orthogonal frequency-division multiplexed (OFDM) signal representing the inverse Fourier transform (IFT) of a combination of the modulated subchannel carriers spanning the bandwith;
   (c) modulating a channel carrier signal with the complex OFDM signal;
   (d) amplifying the modulated channel carrier signal to produce an output signal;
   (e) producing two vector baseband feedback signals corresponding to the output signal; and
   (f) adjusting the modulated channel carrier signal to maintain output signal linearity responsive to the two vector baseband feedback signals in a feedback loop.

7. The method of claim 6 further comprising the steps of:
   (d.1) producing two Cartesian vector baseband feedback signals corresponding to the output signal; and
   (e.1) adjusting the Cartesian vector baseband feedback signal phases to stabilize the feedback loop.

8. A transceiver system for transferring a data sequence through a narrowband radio frequency (RF) channel comprising:
   transmitter means for transmitting a first narrowband signal, including
      multiplexer means for distributing the data sequence over a plurality of concurrent sub-sequences,
      subchannel modulator means coupled to the multiplexer means for modulating each of a plurality of subchannel carriers with a corresponding sub-sequence,
      first digital signal processor (DSP) means coupled to the subchannel modulator means for producing a complex orthogonal frequency-division multiplexed (OFDM) signal representing the inverse Fourier transform (IFT) of a combination of the modulated subchannel carriers,
      complex modulator means coupled to the first DSP means for modulating a channel carrier signal with the complex OFDM signal;
      power amplifier means coupled to the complex modulator means for amplifying the modulated channel carrier signal to produce an output signal representing the first narrowband signal,
      vector linearizer means coupled to the power amplifier means for producing two vector baseband feedback signals corresponding to the output signal, in part by demodulating the modulated carrier signal using a delayed carrier signal, and
      feedback means coupled to the vector linearizer means and the first DSP means for adjusting the modulated channel carrier signal to maintain output signal linearity responsive to the two vector baseband feedback signals in a feedback loop; and
   receiver means for receiving a second narrowband signal, including
      tuner means for detecting the second narrowband signal,
      second DSP means for producing an input signal representing the Fourier transform (FT) of the second narrowband signal, and demodulator means for demodulating the input signal to recover a corresponding plurality of concurrent sub-sequences and the corresponding data sequence.

9. The system of claim 8 further comprising:
coupled to the subchannel modulating means, amplitude phase shift keying (APSK) means for modulating each of the plurality of subchannel carriers with APSK modulation.

10. The system of claim 9 further comprising:
coupled to the vector linearizer means,
   means for producing two Cartesian vector baseband feedback signals corresponding to the output signal, and
   means for adjusting the Cartesian vector baseband feedback signal phases to stabilize the feedback loop.

11. The system of claim 10 further comprising:
coupled to the tuner means,
   means for measuring and storing phase errors in the detected second narrowband signal during selected time intervals, and
   means for adjusting the detected second narrowband signal phase responsive to the stored phase error measurements.

12. The system of claim 8 further comprising:
coupled to the tuner means,
   means for measuring and storing phase errors in the detected second narrowband signal during selected time intervals, and
   means for adjusting the detected second narrowband signal phase responsive to the stored phase error measurements.

13. A transceiver system for transferring a data sequence through a narrowband channel occupying a bandwidth of less than approximately 0.1% of a carrier frequency, the system comprising:
   amplitude phase shift keying (APSK) modulator means for modulating a plurality of concurrent subchannel carriers spanning the bandwith with APSK modulation to represent the data sequence;
   digital signal processor (DSP) means for producing a complex orthogonal frequency-division multiplexed (OFDM) signal representing the inverse Fourier transform (IFT) of a combination of the modulated subchannel carriers;
   complex modulator means coupled to the DSP means for modulating a channel carrier signal with the complex OFDM signal;
   power amplifier means for amplifying the modulated channel carrier signal to produce an output signal;
   vector linearizer means for producing two baseband vector feedback signals corresponding to the output signal; and
   feedback means for adjusting the modulated channel carrier signal to maintain output signal linearity responsive to the two baseband vector feedback signals in a feedback loop.

14. The system of claim 13 further comprising:
coupled to the vector linearizer means,
   means for producing two Cartesian vector baseband feedback signals corresponding to the amplified modulated channel carrier signal, and
   means for adjusting the Cartesian vector baseband feedback signal phases to stabilize the feedback loop.

15. In a transceiver system for transferring a data sequence through a narrowband channel, a transmitter for transmitting a narrowband signal occupying a bandwidth of less than approximately 0.1% of a carrier frequency, the transmitter comprising:
   a digital multiplexer for distributing the data sequence over a plurality of concurrent sub-sequences spanning the bandwith;
   a subchannel modulator coupled to the digital multiplexer for modulating each of a plurality of subchannel carriers with a corresponding sub-sequence;
   a digital signal processor (DSP) coupled to the subchannel modulator for producing a modulated channel carrier signal representing the inverse Fourier transform (IFT) of a combination of the modulated subchannel carriers;
   a complex modulator coupled to the DSP for modulating a channel carrier signal with the complex OFDM signal;
   a power amplifier coupled to the modulator for amplifying the modulated channel carrier signal to produce an output signal;
   a vector linearizer circuit coupled to the power amplifier for producing two vector baseband feedback signals corresponding to the output signal; and
   a feedback loop coupling the vector linearizer circuit to the modulator for adjusting the modulated channel carrier signal to maintain output signal linearity responsive to the two vector baseband feedback signals.

16. The transmitter of claim 15 further comprising:
   an amplitude phase shift keying (APSK) modulator coupled to the digital multiplexer for modulating each of the plurality of subchannel carriers with APSK modulation.

17. The transmitter of claim 16 further comprising:
   a Cartesian vector linearizer circuit coupled to the power amplifier for producing two Cartesian vector baseband feedback signals corresponding to the output signal; and
   a phase shifter coupled to the Cartesian vector linearizer circuit for adjusting the Cartesian vector baseband feedback signal phases to stabilize the feedback loop.

18. A method for transferring a data sequence through a narrowband channel, the method comprising:
   generating a Local Oscillator (LO) signal at a carrier frequency;
   generating a complex Orthogonal Frequency Division Multiplex (OFDM) signal occupying a bandwidth of less than approximately 0.1% of the carrier frequency;
   modulating the LO signal with the complex OFDM signal to generate a narrowband modulated carrier signal;
   amplifying the narrowband modulated carrier signal to produce an output signal;
   producing a vector baseband feedback signal corresponding to the output signal, in part, by demodulating the modulated carrier signal using a delayed LO signal; and
   adjusting the narrowband modulated carrier signal responsive to the vector baseband feedback signal in a feedback loop.

19. The method of claim 18, wherein the complex OFDM signal bandwidth comprises approximately 25 kilohertz.

* * * * *